US011641378B2

(12) United States Patent
Hajost

(10) Patent No.: US 11,641,378 B2
(45) Date of Patent: May 2, 2023

(54) AUTOMATED COMPLIANCE FOR SECURITY BENCHMARK ASSURANCE

(71) Applicant: SteelCloud, LLC, Ashburn, VA (US)

(72) Inventor: Brian H. Hajost, Great Falls, VA (US)

(73) Assignee: Steelcloud LLC, Ashburn, VA (US)

( * ) Notice: Subject to any disclaimer, the term of this patent is extended or adjusted under 35 U.S.C. 154(b) by 91 days.

(21) Appl. No.: 16/869,576

(22) Filed: May 7, 2020

(65) Prior Publication Data

US 2021/0352112 A1 Nov. 11, 2021

(51) Int. Cl.
*H04L 9/40* (2022.01)
*H04L 41/0803* (2022.01)

(52) U.S. Cl.
CPC ........ *H04L 63/205* (2013.01); *H04L 41/0803* (2013.01); *H04L 63/0227* (2013.01)

(58) Field of Classification Search
CPC ............... H04L 63/0227; H04L 63/205; H04L 41/0803
USPC ........................................................ 709/221
See application file for complete search history.

(56) References Cited

U.S. PATENT DOCUMENTS

2014/0223176 A1* 8/2014 Hajost .................... H04L 63/20 713/165
2018/0084009 A1* 3/2018 Goyal .................... H04L 63/10
2020/0119983 A1* 4/2020 D'Onofrio .......... H04L 41/0609
2021/0194929 A1* 6/2021 Garrett ............... H04L 41/0866

* cited by examiner

*Primary Examiner* — James E Springer
*Assistant Examiner* — Patrick F Ngankam
(74) *Attorney, Agent, or Firm* — CRGO Global; Steven M. Greenberg

(57) ABSTRACT

A method for migrating security benchmark compliance content from a source platform to a target platform includes filtering a set of configuration parameters in a source platform to a subset of configuration parameters, each of the parameters corresponding to a respectively different entry in a security checklist of a security benchmark. Then, a listing is presented in a user interface of each of the configuration parameters and for each configuration parameter, a corresponding entry in the security checklist regulating the configuration parameter according to a range of values. Finally, the configuration parameters in the subset are applied to a target platform excepting for at least one of the configuration parameters. Instead, alternative value within the range is received as input in the user interface and is applied to the target platform in lieu of the at least one of the configuration parameters.

15 Claims, 2 Drawing Sheets

AUTOMATED COMPLIANCE FOR SECURITY BENCHMARK ASSURANCE

BACKGROUND OF THE INVENTION

Field of the Invention

The present invention relates to the field of automated compliance for computing devices and more particularly, to the migration of a compliant computing device from a source computing platform to a target computing platform.

Description of the Related Art

A security benchmark is a collection best practices guidelines specified to secure a computing platform. Examples include those controls specified by the Center for Internet Security (CIS) and those controls specified by the United States government in the form of a Security Technical Implementation Guide (STIG). A STIG is a configuration standard for devices and computing systems confirming to governmentally mandated information assurance (IA), generally information security. Published by the United States Defense Information Security Agency (DISA), each STIG contains technical guidance to secure an information system that might otherwise be vulnerable to a malicious computer attack. At present, DISA has published nearly five-hundred STIGs, and continues to do so with regularity. Consequently, configuring an information system to be in compliance with one or more STIGs is an ongoing process requiring significant expertise.

Because complying with the changing landscape defined by the ongoing development of STIGs can seem daunting, DISA provides both requirements and tools for validating and implementing the security requirements. In this regard, there are several common testing tools that implement STIGs. Some tools have been developed privately, while others have been developed publicly within the various agencies of government. There are even tools that have been developed to encompass a particular category of system components, such as network components, or a particular functional process, such as log aggregation and analysis.

Generally speaking, configuring a target platform for security benchmark compliance requires the establishment of values for each configuration parameters specified by a security benchmark, with each value falling within a range specified by the security benchmark as acceptable. Knowing the various permissible ranges for different values of different configuration parameters, however, can be quite challenging given the sheer number of prospective configuration parameters implicated by a security benchmark. Thus, the process of configuring a target platform for security benchmark compliance can be quite daunting.

BRIEF SUMMARY OF THE INVENTION

Embodiments of the present invention address deficiencies of the art in respect to target platform configuration for security benchmark compliance assurance, and provide a novel and non-obvious method, system and computer program product for migrating security benchmark compliance content from a source platform to a target platform. In an embodiment of the invention, a method for migrating security benchmark compliance content from a source platform to a target platform includes filtering a set of configuration parameters in a source platform to a subset of configuration parameters each corresponding to a respectively different entry in a security checklist of a security benchmark. The method further includes presenting in a user interface, a listing of each of the configuration parameters and, for each one of the configuration parameters, a corresponding entry in the security checklist regulating the one of the configuration parameters according to a range of values. Finally, the method yet further includes applying the configuration parameters in the subset to a target platform excepting for at least one of the configuration parameters and for the at least one of the configuration parameters, instead receiving as input in the user interface an alternative value within the range of values of the corresponding entry in the security checklist and applying the alternative value to the target platform in lieu of the at least one of the configuration parameters.

In one aspect of the embodiment, it may be determined that one of the configuration parameters in the subset falls outside of the range of values specified by the corresponding entry in the security checklist and thus is non-compliant with respect to the security benchmark. In consequence, a prompt is presented in the user interface to accept the non-compliant one of the configuration parameters. Upon receiving an indication of ascension to the prompt, the non-compliant one of the configuration parameters may be applied to the target platform.

In another aspect of the embodiment, the filtering may be performed by searching the source platform for configuration parameters each corresponding to a different entry in the security checklist of the security benchmark, and including in the subset a tuple for each located one of the configuration parameters and a corresponding entry in the security checklist. Alternatively, the filtering may be performed by searching the security benchmark for an entry in the security checklist corresponding to each one of the configuration parameters and including in the subset, only ones of the configuration parameters for which a corresponding entry in the security checklist is located.

In another embodiment of the invention, a data processing system is configured for migrating security benchmark compliance content from a source platform to a target platform. The system includes a host computing platform that has one or more computers, each with memory and at least one processor. The system also includes a security benchmark compliant migration module. The module includes computer program instructions enabled upon execution in the host computing platform to filter a set of configuration parameters in a source platform to a subset of configuration parameters, with each configuration parameter corresponding to a respectively different entry in a security checklist of a security benchmark.

The program instructions further present in a user interface provided in a display of the host computing platform, a listing of each of the configuration parameters, with each one of the configuration parameters having a corresponding entry in the security checklist that regulates the one of the configuration parameters according to a range of values. Finally, the program instructions apply the configuration parameters in the subset to a target platform excepting for at least one of the configuration parameters. As to the at least one of the configuration parameters, instead an alternative value is received as input in the user interface that is within the range of values of the corresponding entry in the security checklist. In that instance, the alternative value may be applied to the target platform in lieu of the at least one of the configuration parameters.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the migration of security benchmark compliance content from a source platform to a target platform. In accordance with an embodiment of the invention, a set of configuration parameters of a source operating system are retrieved from the source operating system and values assigned to each of the configuration parameters determined. The parameters are then filtered to a subset which are compared to a security benchmark checklist of parameters. A range for each of the compared parameters in the filtered subset is then retrieved and a value received for one of the parameters that differs from a corresponding assigned value. To the extent that the received value falls outside of the retrieved range, an alert is presented indicating the out of range value. But otherwise, the parameters in the subset along with the assigned values including the received value are applied to a target operating system. In this way, a previously acceptable configuration for a security benchmark on one platform may be applied to another while permitting changes in parameter values within a range set forth in the security benchmark.

Figure 1:
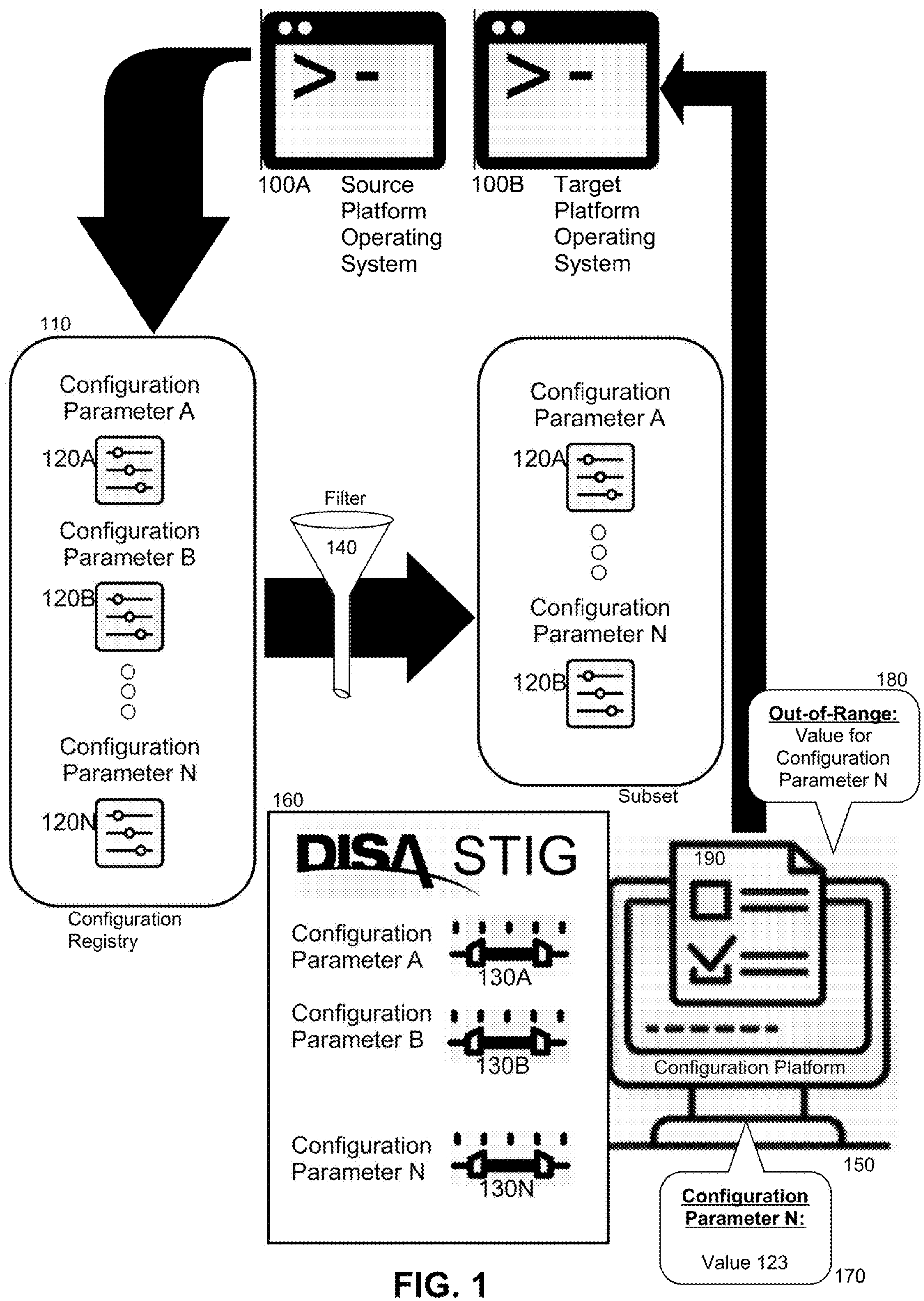
FIG. 1 is a pictorial illustration of a process for migrating security benchmark compliance content from a source platform to a target platform.

In further illustration, FIG. 1 pictorially shows a process for migrating security benchmark compliance content from a source platform to a target platform. As shown in FIG. 1, a configuration registry 110 of a source platform operating system 100A is scanned to identify different configuration parameters 120A, 120B, 120N of the source platform operating system 100A. A filter 140 is then applied to reduce the configuration parameters 120A, 120B, 120N to only a subset of the parameters 120A, 120B. A security benchmark 160, such as a STIG or a CIS control, is then retrieved and a range of values 130A, 130B, 130N for each of the configuration parameters 120A, 120B in the subset identified. The range of values 130A, 130B, 130N are then presented in a user interface 190 of a configuration platform 150 and a modification 170 to one of the values of the configuration parameters 120A, 120B received.

To the extent that the modification 170 falls outside of a corresponding one of the ranges 130A, 130B, 130N, a prompt 180 is presented in the user interface 190. The prompt 180 may simply indicate a need to provide a value within the corresponding one of the ranges 130A, 130B, 130N, or the prompt 180 may request an affirmation of the use of the value even though the value falls outside of the corresponding one of the ranges 130A, 130B, 130N. Thereafter, the configuration parameters 120A, 120B in the subset are applied to a target platform operating system 100B so as to place the target platform operating system 100B in compliance with the security benchmark 160 while permitting a variation from the configuration of the source platform operating system.

Figure 2:
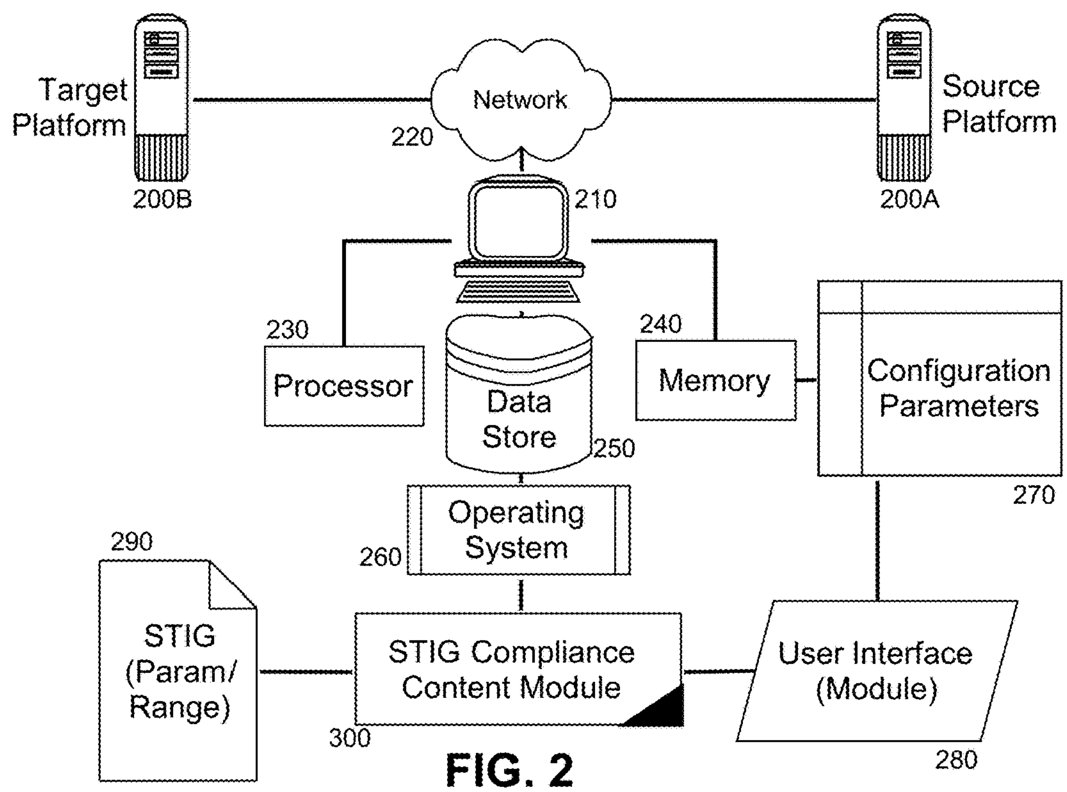
FIG. 2 is a schematic illustration of a data processing system configured for migrating security benchmark compliance content from a source platform to a target platform; and, FIG. 3 is a flow chart illustrating a process for migrating security benchmark compliance content from a source platform to a target platform.

The process described in connection with FIG. 1 may be implemented in a data processing system. In further illustration, FIG. 2 schematically shows a data processing system configured for migrating security benchmark compliance content from a source platform to a target platform. The system includes a host computing platform 210 including at least one computer, each with at least one processor 230, memory 240 and persistent storage 250, and communicatively coupled over computer communications network 220 to both a source computing platform 200A including at least one computer, and a target computing platform 200B including at least one computer. The host computing platform 210 acts as a configuration platform configuring the target platform 200B as a variation of a configuration of the source platform 200A.

An operating system 260 executes in the memory 240 of the host computing platform 210 and supports the operation of a security benchmark compliance content module 300. The security benchmark compliance module 300 includes computer program instructions adapted during execution in the memory 240 by the processor 230 to retrieve configuration parameters 270 of the source platform 200A into the memory 240 and to select through a user interface 280 to the module 300, a subset of the parameters 270. The program instructions are further adapted during execution to locate in a security benchmark checklist 290 one or more entries corresponding to one or more of the parameters 270 in the subset. The program instructions yet further are adapted to receive a modification to a value of one of the parameters 270 in the subset and to compare the modification to a range of values specified in the security benchmark checklist 290 for the one of the parameters 270 in the subset. Finally, the program instructions are adapted to generate an alert in the user interface 280 when the modification falls outside of the range of the values, but otherwise to write the configuration parameters 270 in the subset, including the modification, to the target platform 200B.

Figure 3:
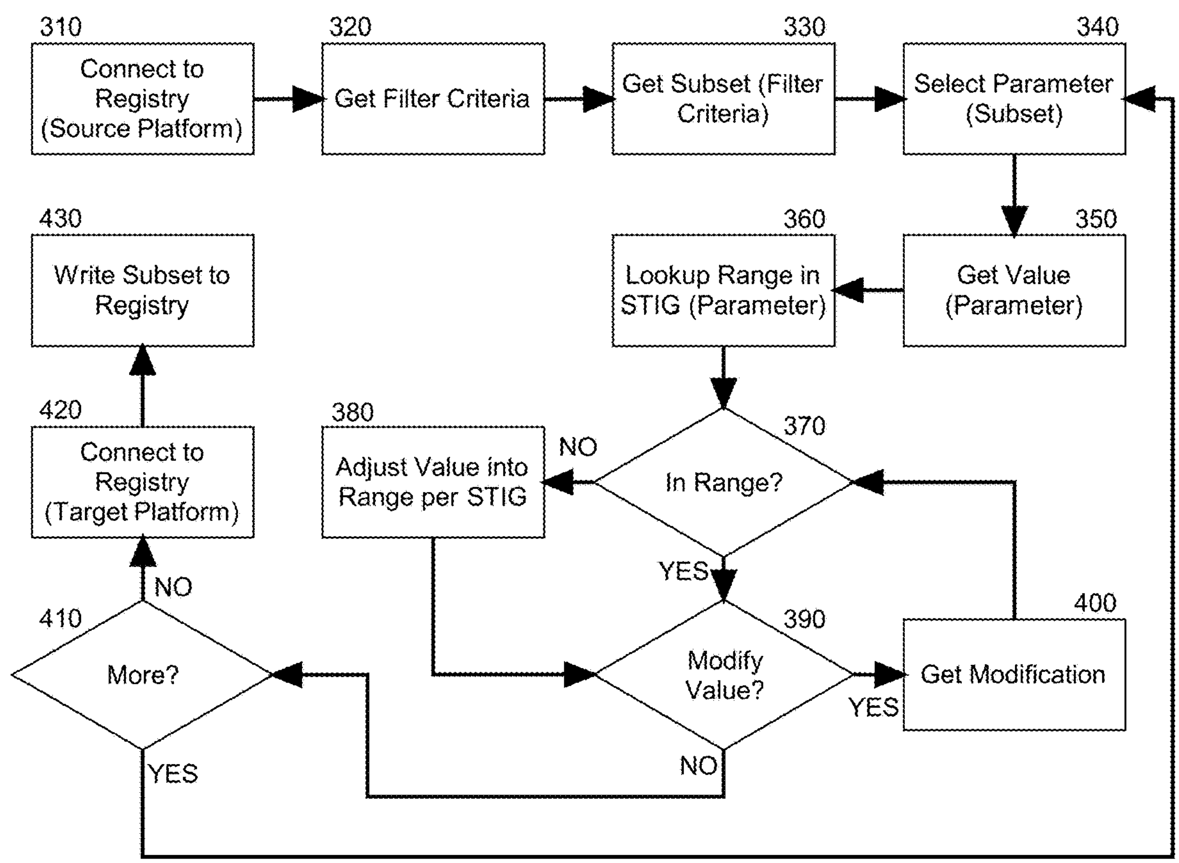

In even yet further illustration of the operation of the security benchmark compliance content module 300, FIG. 3 is a flow chart illustrating a process for migrating security benchmark compliance content from a source platform to a target platform. Beginning in block 310, the module 300 connects to a registry of the source platform. In block 320, filter criteria are specified for the registry. In this regard, the filter criteria can be specified according to different entries in the security benchmark checklist, and in block 330, a subset of configuration parameters in the registry are filtered according to the filter criteria. Optionally, the subset can include different entries, each a tuple for each located configuration parameter and a corresponding entry in the security checklist. In block 340, a first parameter is selected in the subset for processing. In block 350, a value for the first parameter is retrieved and in block 360, a query is issued to a security benchmark checklist including an indication of permissible range for the configuration parameter. In decision block 370, it is determined if the value for the first parameter is within the permissible range. If not, in block 380 the value is adjusted into the permissible range.

In decision block 390, it is determined whether or not the end user seeks to modify the value. If so, in block 400 a modification is received to the value and, once again, in decision block 370 it is determined if the modification is within the permissible range for the configuration parameters as set forth in the security benchmark checklist. If not, once again the value is adjusted into range in block 380. In decision block 390, when it is determined that no further modification of the value is specified, in decision block 410, it is determined if additional configuration values remain to be processed in the subset. If so, the process returns to block 340 with a selection of a next parameter. But, in decision block 410, when no further configuration parameters remain to be processed. In block 420 a connection is established with a registry of a target platform and in block 430, the values for the configuration parameters in the subset are written to the registry of the target platform.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

I claim:

1. A method for migrating security benchmark compliance content from a source platform to a target platform, the method comprising:

scanning a configuration registry of a source platform to identify a set of configuration parameters applied to the source platform;

filtering the set of configuration parameters from the source platform to a subset of configuration parameters each corresponding to a respectively different entry in a security checklist of a security benchmark;

presenting in a user interface, a listing of each of the configuration parameters and, for each one of the configuration parameters, a corresponding entry in the security checklist regulating the one of the configuration parameters according to a range of values;

applying the configuration parameters in the subset to a target platform excepting for at least one of the configuration parameters;

for the at least one of the configuration parameters, specifying a modification comprising a differing value than that of the source platform and determining that the modification falls outside of the range of values specified by the corresponding entry in the security checklist and thus is non-compliant with respect to the security benchmark; and automatically adjusting the differing value into the range of values specified by the corresponding entry in the security checklist.

2. The method of claim 1, further comprising:

determining that one of the configuration parameters in the subset falls outside of the range of values specified by the corresponding entry in the security checklist and thus is non-compliant with respect to the security benchmark;

prompting in the user interface to accept the non-compliant one of the configuration parameters; and, applying the non-compliant one of the configuration parameters to the target platform.

3. The method of claim 1, wherein the filtering is performed by searching the source platform for configuration parameters each corresponding to a different entry in the security checklist of the security benchmark, and including in the subset a tuple for each located one of the configuration parameters and a corresponding entry in the security checklist.

4. The method of claim 1, wherein the filtering is performed by searching the security benchmark for an entry in the security checklist corresponding to each one of the configuration parameters and including in the subset, only ones of the configuration parameters for which a corresponding entry in the security checklist is located.

5. The method of claim 1, wherein the security benchmark is a Security Technical Implementation Guide (STIG).

6. A data processing system configured for migrating security benchmark compliance content from a source platform to a target platform, the system comprising:

a host computing platform comprising one or more computers, each with memory and at least one processor; and, a security benchmark compliant migration module comprising computer program instructions enabled upon execution in the host computing platform to perform:

scanning a configuration registry of a source platform to identify a set of configuration parameters applied to the source platform;

filtering the set of configuration parameters from the in a source platform to a subset of configuration parameters each corresponding to a respectively different entry in a security checklist of a security benchmark;

presenting in a user interface presented in a display of the host computing platform, a listing of each of the configuration parameters and for each one of the configuration parameters, a corresponding entry in the security checklist regulating the one of the configuration parameters according to a range of values;

applying the configuration parameters in the subset to a target platform excepting for at least one of the configuration parameters;

for the at least one of the configuration parameters, specifying a modification comprising a differing value than that of the source platform and determining that one of the configuration parameters in the subset the modification falls outside of the range of values specified by the corresponding entry in the security checklist and thus is non-compliant with respect to the security benchmark; and automatically adjusting the differing value one of the configuration parameters into the range of values specified by the corresponding entry in the security checklist.

7. The system of claim 6, wherein the program instructions further perform:

determining that one of the configuration parameters in the subset falls outside of the range of values specified by the corresponding entry in the security checklist and thus is non-compliant with respect to the security benchmark;

prompting in the user interface to accept the non-compliant one of the configuration parameters; and, applying the non-compliant one of the configuration parameters to the target platform.

8. The system of claim 6, wherein the filtering is performed by searching the source platform for configuration parameters each corresponding to a different entry in the security checklist of the security benchmark, and including in the subset a tuple for each located one of the configuration parameters and a corresponding entry in the security checklist.

9. The system of claim 6, wherein the filtering is performed by searching the security benchmark for an entry in the security checklist corresponding to each one of the configuration parameters and including in the subset, only ones of the configuration parameters for which a corresponding entry in the security checklist is located.

10. The system of claim 6, wherein the security benchmark is a Security Technical Implementation Guide (STIG).

11. A computer program product for migrating security benchmark compliance content from a source platform to a target platform, the computer program product including a non-transitory computer readable storage medium having program instructions embodied therewith, the program instructions executable by a device to cause the device to perform a method including:

scanning a configuration registry of a source platform to identify a set of configuration parameters applied to the source platform;

filtering the set of configuration parameters from the source platform to a subset of configuration parameters each corresponding to a respectively different entry in a security checklist of a security benchmark;

presenting in a user interface, a listing of each of the configuration parameters and for each one of the configuration parameters, a corresponding entry in the security checklist regulating the one of the configuration parameters according to a range of values;

applying the configuration parameters in the subset to a target platform excepting for at least one of the configuration parameters;

for the at least one of the configuration parameters, specifying a modification comprising a differing value than that of the source platform and determining that the modification falls outside of the range of values specified by the corresponding entry in the security checklist and thus is non-compliant with respect to the security benchmark; and automatically adjusting the differing value into the range of values specified by the corresponding entry in the security checklist.

12. The computer program product of claim 11, wherein the method further comprises:

determining that one of the configuration parameters in the subset falls outside of the range of values specified by the corresponding entry in the security checklist and thus is non-compliant with respect to the security benchmark;

prompting in the user interface to accept the non-compliant one of the configuration parameters; and, applying the non-compliant one of the configuration parameters to the target platform.

13. The computer program product of claim 11, wherein the filtering is performed by searching the source platform for configuration parameters each corresponding to a different entry in the security checklist of the security benchmark, and including in the subset a tuple for each located one of the configuration parameters and a corresponding entry in the security checklist.

14. The computer program product of claim 11, wherein the filtering is performed by searching the security benchmark for an entry in the security checklist corresponding to each one of the configuration parameters and including in the subset, only ones of the configuration parameters for which a corresponding entry in the security checklist is located.

15. The computer program product of claim 11, wherein the security benchmark is a Security Technical Implementation Guide (STIG).

* * * * *